(12) United States Patent
Otana (10) Patent No.: US 7,206,498 B2
(45) Date of Patent: Apr. 17, 2007

(54) RECORDER

(75) Inventor: Hiroshi Otana, Ikoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1095 days.

(21) Appl. No.: 10/149,440

(22) PCT Filed: Dec. 25, 2000

(86) PCT No.: PCT/JP00/09222

§ 371 (c)(1),
(2), (4) Date: Jun. 25, 2002

(87) PCT Pub. No.: WO01/48754

PCT Pub. Date: Jul. 5, 2001

(65) Prior Publication Data

US 2002/0181935 A1    Dec. 5, 2002

(30) Foreign Application Priority Data

Dec. 28, 1999    (JP)    ................... 11-372687

(51) Int. Cl.
*H04N 5/91* (2006.01)
(52) U.S. Cl. ........................ 386/83; 386/87; 386/46; 386/95; 386/92; 386/96
(58) Field of Classification Search ................ 386/83, 386/46, 92, 95, 96
See application file for complete search history.

(56) References Cited

U.S. PATENT DOCUMENTS 5,661,526 A * 8/1997 Hamamoto et al. ......... 348/465
6,157,772 A * 12/2000 Kim ............................ 386/83
6,167,188 A * 12/2000 Young et al. ................. 386/83
6,185,538 B1 * 2/2001 Schulz ........................ 704/278
2003/0038895 A1 * 2/2003 Yang et al. ................. 348/569
2004/0223732 A1 * 11/2004 Ko et al. ...................... 386/46

FOREIGN PATENT DOCUMENTS

JP    05-81734    4/1993
JP    11-66661    3/1999

* cited by examiner

Primary Examiner—Thai Q. Tran
Assistant Examiner—Helen Shibru
(74) Attorney, Agent, or Firm—Armstrong, Kratz, Quintos, Hanson & Brooks, LLP (57) ABSTRACT

The invention provides a video recording device which comprises a tuner 2 for receiving a television broadcast signal, an XDS signal extraction circuit 4 for extracting an XDS signal from the received television broadcast signal, a VCR mechanism 6 for recording image signals on a magnetic tape, and a control circuit 5. The control circuit 5 calculates broadcast remaining time remained until broadcast of a program being recorded is terminated based on broadcasting time information and broadcasting time lapse information contained in the XDS signal after recording operation is started at a standard speed, calculates recordable time wherein the recording is performed on the magnetic tape at a 3×-speed, changes over recording speed to 3×-speed when the broadcast remaining time is in match with the recordable time to continue the recording operation.

5 Claims, 6 Drawing Sheets

RECORDER

TECHNICAL FIELD

The present invention relates to video-recording devices such as VCRs (video cassette recorders), video disk players, and the like for receiving a broadcast signal and recording the signal on a recording medium.

BACKGROUND ART

VCRs are conventionally known which have a function of setting a recording speed automatically by change-over and starting video-recording operation so as to record a desired program to be recorded by the user on one video cassette tape.

The VCR having such a function will be so adapted that, when the user inputs usual timer preselecting setting information, i.e. a channel of a desired program to be recorded, and broadcast starting time and broadcast termination time, broadcasting time of the program is calculated based on the broadcast starting and the terminate time, recordable time of a set tape is calculated, a recording speed is selectively set automatically by change-over based on the broadcasting time and the recordable time that have been calculated to start the recording operation.

For example, with the VCRs adapted to set selectively the recording speed by change-over between so-called standard speed and 3x-speed, in the case where a program desired by the user can be recorded on one cassette tape at the standard speed, the recording operation starts at the standard speed. In the case where the program cannot be recorded on one tape at the standard speed, the recording speed is set by change-over to the 3x-speed to start the recording operation.

Thus, the program desired by the user is recorded on one cassette tape.

However, when the conventional VCR described perform automatic recording by timer setting, the broadcast time of the program to be recorded is calculated based on the broadcast starting and the termination time input by the user, entailing the problem of not realizing the function described in usual manual recording.

Further, with the conventional VCR described, in the case where the broadcasting time of the program being recorded is extended and the broadcast termination time becomes later than is scheduled, the recording operation is continued at the recording speed set by change-over before the start of the recording operation regardless of the extended broadcast time, whereby there is a possibility of not recording the desired program to the end of the program.

An object of the present invention is to provide a video-recording device for performing a function of automatically changing over recording operation and changing recordable time on a recording medium not only in automatic recording by timer setting but also in usual manual recording, and for recording a desired program to the end of the program on the recording medium even if broadcast termination time of the program is extended.

DISCLOSURE OF THE INVENTION

It is practice in North America to superpose a control signal entitled XDS (Extended Data Service) standard on the 21st horizontal section of vertical blanking period in the second field of the television broadcast signal and to transmit the signal. The XDS signal contains broadcasting time information representing broadcasting time of a program, and broadcasting time lapse information representing the lapse of time from the start of the program broadcasting.

The present inventors have conducted intensive research to fulfill the above object described, and have conceived the idea of utilizing the broadcasting time information and the broadcasting time lapse information, both of which are contained in the XDS signal to accomplish the present invention.

The present invention provides a video recording device for receiving and recording on a recording medium television broadcast signals having superposed thereon for each program broadcasting time information representing broadcasting time of a program and broadcasting time lapse information representing lapse of time from start of the program broadcasted, and for changing recordable time on the recording medium by changing over recording operation of recording mechanism. The video recording device is characterized in that the device comprises:

means for receiving the television broadcast signals,
information separating means for separating the broadcasting time information and the broadcasting time lapse information from the television broadcast signal received,
first time calculating means for periodically or aperiodically calculating broadcast remaining time remained until broadcast of the program being recorded is terminated based on the broadcasting time information and the broadcasting time lapse information which are separated during recording,
second time calculating means for calculating the recordable time at the time when the broadcast remaining time is calculated according to the first time calculating means, and
recording operation change-over means for changing over the recording operation of the recording mechanism to operation wherein the recordable time is in match with the broadcast remaining time or to operation wherein the recordable time becomes longer than the broadcast remaining time based on the broadcast remaining time calculated according to the first time calculating means and the recordable time calculated according to the second time calculating means.

The video recording device of the present invention starts to monitor the broadcasting time information and the broadcasting time lapse information after the start of the recording, calculates the broadcast remaining time by the subtraction of the broadcasting time lapse information from the broadcasting time information, and calculates the recordable time at the time when the broadcast remaining time is calculated. The recording operation is changed over to operation wherein the recordable time is in match with the broadcast remaining time or to operation wherein the recordable time becomes longer than the broadcast remaining time, continuing the recording. Accordingly, the program desired by the user is recorded toward the end of the program on the recording medium.

Thus, the video-recording device embodying the invention calculates the broadcast remaining time of the program being recorded based on the broadcasting time information and the broadcasting time lapse information contained in the television broadcast signal, so that the device need not be provided with information of broadcast starting or termination time required for the conventional device to calculate the broadcast time of the program to be recorded. Therefore, the device of the invention can realize the function described for changing over the recording operation automatically not only in the automatic recording by the timer setting but also in the usual manual recording.

Furthermore, the user need not input the broadcast termination time, so that the user uses the function described with easier manipulation than in the case of the conventional device requiring the user to input the broadcast termination time.

Further, the video-recording device of the present invention monitors the broadcasting time information and the broadcasting time lapse information of the program being recorded after the start of the recording, and calculates the broadcast remaining time periodically or aperiodically based on the information. In the case where the broadcasting time of the program is extended, the broadcasting time information contained in the television broadcast signal is updated in accordance with the extension of the broadcast time. Accordingly, even if the broadcast time of the program being recorded is extended, the broadcast remaining time is calculated based on broadcasting time information and broadcasting time lapse information updated in accordance with the extension to change over the recording operation based on the broadcast remaining time and the recordable time as described above, whereby the program being recorded is recorded on the recording medium to the end of the program.

Stated specifically, the device comprises recording starting means for starting the recording operation of the recording mechanism so that the recordable time becomes shortest in response to a manipulation by the user. The second time calculating means calculates the recordable time when the recording operation is continued so that the recordable time becomes longest. The recording operation change-over means changes over the recording operation of the recording mechanism to operation for making the recordable time longest when the broadcast remaining time is in match with the recordable time.

With the specific construction, after the recording is started with operation for making the recordable time shortest, when a match is found between the broadcasting remaining time of the program being recorded and the recordable time when the recording is continued with operation for making the recordable time longest, the recording operation is changed over to operation for making the recordable time longest, so that the recording medium is full in capacity upon the termination of the program being recorded. If the recording is performed with operation for making the recordable time short, higher quality image is obtained than with operation for making the recordable time long.

With the video recording device described, the recording medium utilizes its recording capacity effectively, whereby a program desired by the user is recorded with high quality image to the greatest possible extent.

Further stated specifically, the video recording device comprises capacity detecting means for detecting that a recording medium becomes full in recording capacity, and recording termination means for completing the recording operation of the recording mechanism when detecting that the medium becomes full in recording capacity.

As described above, the recording medium becomes full in the recording capacity when the broadcast of the program being recorded is completed. Therefore, with the device thus constructed, the time when the broadcast of the program being recorded is terminated is in match with the time when the recording operation is completed.

Stated more specifically, the recording medium is a tapelike medium, and the recording operation change-over means changes over a moving speed of the medium.

In the case where the moving speed of the tapelike recording medium is increased, the recordable time of the tapelike recording medium becomes short. On the other hand, in the case where the moving speed of the medium is decreased, the recordable time becomes long.

According to the specific construction, the advantage described above changes the recordable time of the recording medium.

Alternatively, the recording medium is a disklike medium, and the recording operation change-over means changes over information amount fed from the recording mechanism to the disklike recording medium.

In the case where information amount fed to the disklike recording medium is increased, the recordable time of the medium becomes short. On the other hand, in the case where information amount fed to the medium is decreased, the recordable time becomes long.

According to the specific construction, the advantage described above changes the recordable time of the recording medium.

The video recording device of the present invention can realize a function for changing the recordable time of the recording medium by the automatic change-over of the recording operation, not only during the automatic recording by timer setting but also during the usual manual manipulation. Moreover, a desired program can be recorded on the recording medium to the end of the program, even in the case where the broadcast termination time of the program is extended beyond scheduled time.

BEST MODE OF CARRYING OUT THE INVENTION

With reference to the drawings, a detailed description will be given below of the present invention as embodied into a VCR which is selectively settable in a standard speed or in a 3× speed.

Circuit Construction

Figure 1:
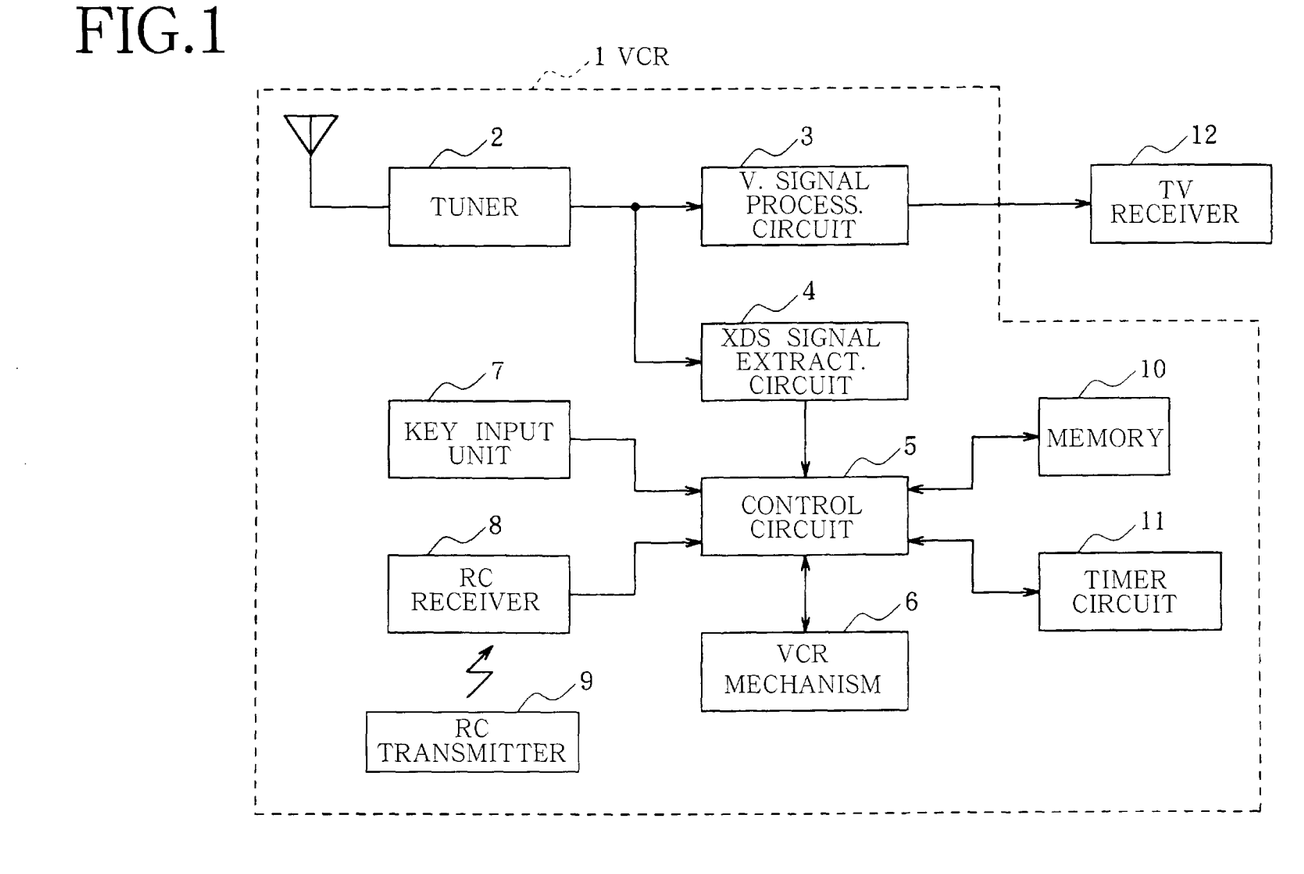
FIG. 1 is a block diagram showing the construction of a VCR embodying the present invention.

A VCR 1 of the present invention has a tuner 2 for receiving a television broadcast wave as shown in FIG. 1. A television broadcast signal obtained from the tuner 2 is input to a video signal processing circuit 3, which prepares a video signal in a predetermined format to output the signal to a TV receiver 12.

On the other hand, a control circuit 5 having a microcomputer controls a VCR mechanism 6 for recording video signals on a magnetic tape.

Connected to the output terminal of the tuner 2 is an XDS signal extraction circuit 4, which extracts an XDS signal superposed on the television broadcast signal. The extracted XDS signal is fed to the control circuit 5.

Connected to the control circuit 5 are a key input unit 7 having a plurality of manual keys, a remote control receiver 8 for receiving a remote control signal from a remote control transmitter 9, a memory 10 for storing preselected program recording information, etc. which is input by the manipulation of the key input device 7 and the remote control transmitter 9, and a timer circuit 11 for performing a time measuring function, respectively.

First Embodiment

A VCR of the embodiment is alternatively settable by change-over in a usual mode wherein recording operation is performed at either recording speed of a standard speed or 3×-speed which has been set by the user in advance, or in an automatic mode wherein the recording speed is automatically changed over between the standard speed and the 3×-speed.

Figure 2:
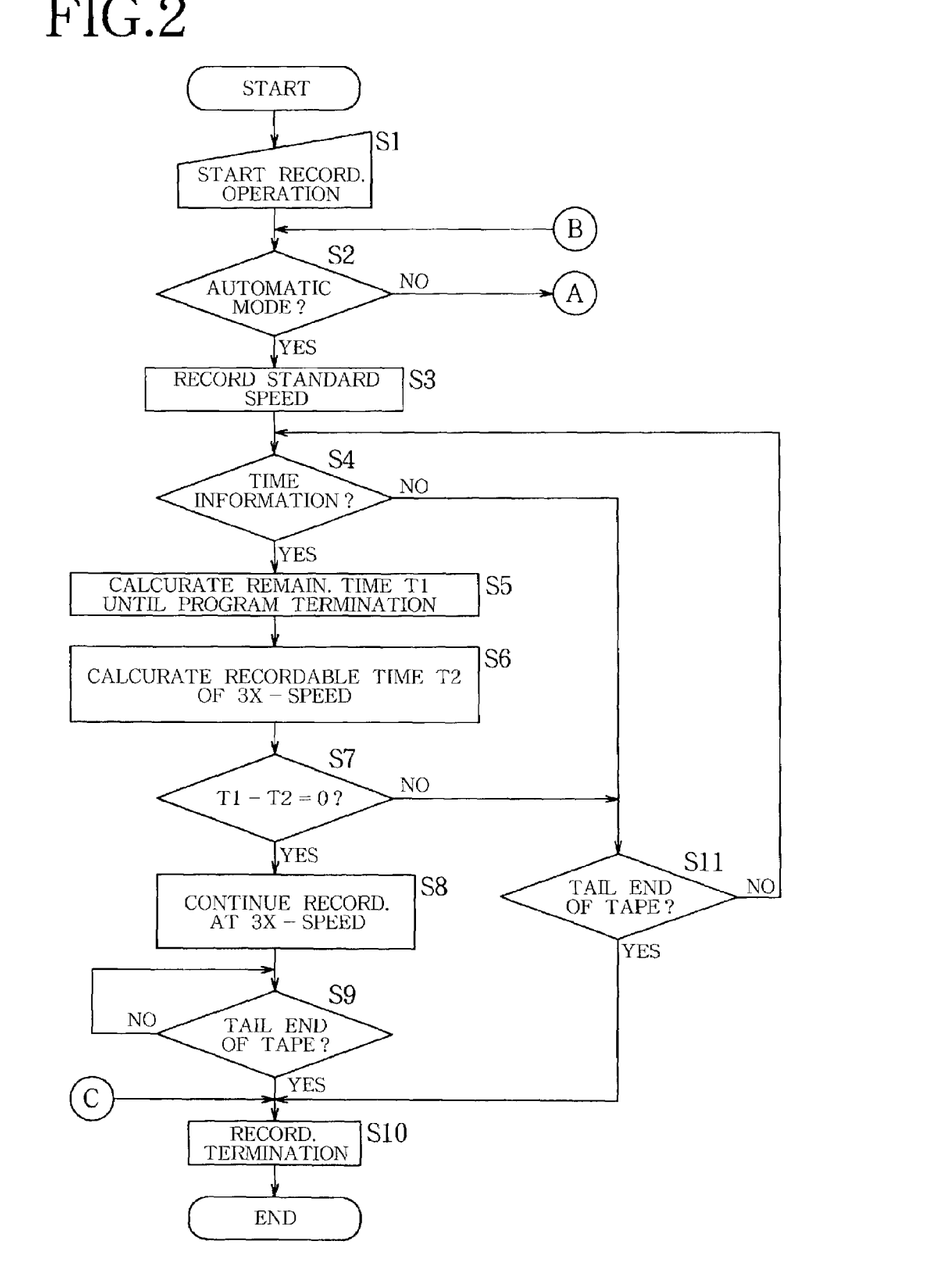
FIG. 2 is a flow chart showing a procedure to be performed by a control circuit included in a first embodiment.
Figure 3:
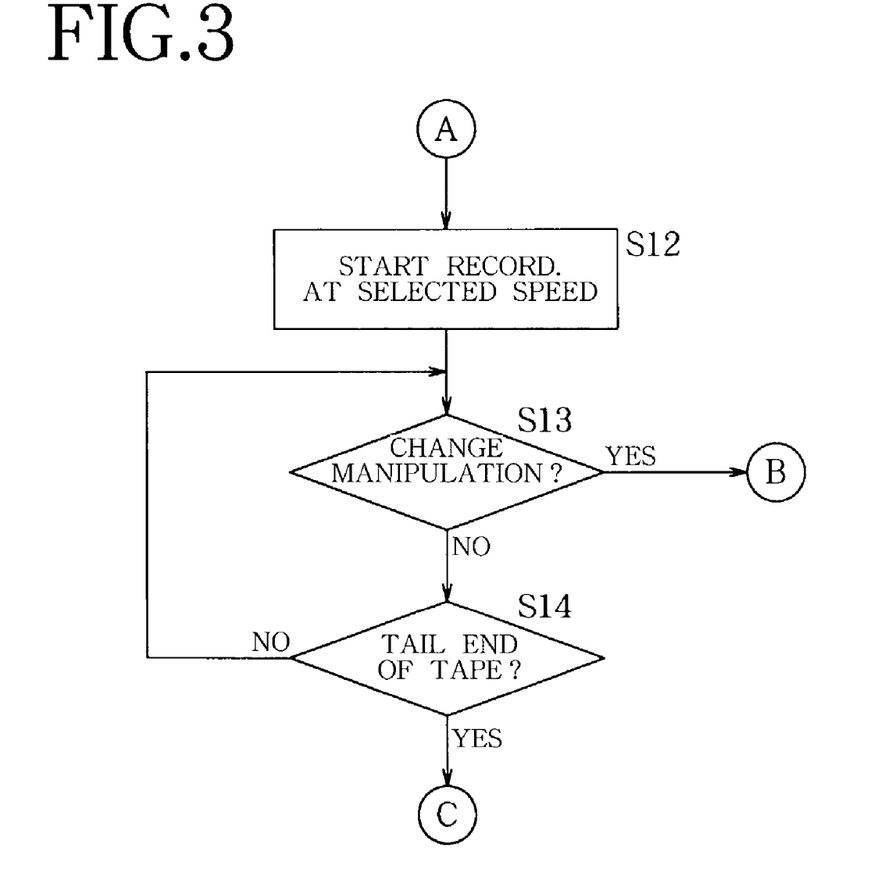
FIG. 3 is a diagram showing part of FIG. 2.

FIGS. 2 and 3 show a procedure to be performed by the control circuit 5 for changing over the recording speed. The user of the VCR 1 of the example selects either mode of a normal mode or an automatic mode. When the user selects the normal mode, the user further selects either a standard speed or a 3×-speed in the recording speed. With the VCR 1, the recording is started by a normal manual manipulation and a timer setting.

First in step S1 shown in FIG. 2, recording starting operation is performed, and an inquiry is thereafter made as to whether the automatic mode is selected.

When the user selects the automatic mode, the answer for step S2 is affirmative, followed by step S3, in which recording operation is started at the standard speed.

Subsequently in step S4, an inquiry is made as to whether an XDS signal obtained from an XDS signal extraction circuit 4 contains broadcasting time information and broadcasting time lapse information. If the answer is affirmative, step S5 follows to calculate broadcast remaining time T1 to be remained from the current time to the time of the broadcast termination of the program being recorded by subtracting the broadcasting time lapse information from the broadcasting time information.

Step S6 thereafter follows to calculate recordable time T2 when the recording is performed at the 3×-speed on the area from a position wherein the tape is currently moving to the tail end of the tape (hereinafter referred to as the remaining area). Then an inquiry is made as to whether the value obtained by subtracting the recordable time T2 from the broadcast remaining time T1 is zero in step S7. If the answer is negative, step S11 follows to inquire as to whether the tape moves to the tail end. When the answer is affirmative, step S10 follows to complete the recording operation. On the other hand, the answer for step S11 is negative, step S4 follows again.

When a match is found between the broadcast remaining time T1 and the recordable time T2, and the answer for step S7 is affirmative, step S8 follows to change over the recording speed to the 3×-speed. Step S9 thereafter follows to inquire as to whether the tape moves to the tail end. If the answer is negative, the same inquiry is repeated in step S9. On the other hand, if the answer is affirmative, step S10 follows to complete the recording operation.

In the case where the program being recorded cannot be recorded on the tape to the end of the program with the recording operation continued at the standard speed, the broadcast remaining time T1 is in match with the recordable time T2 at the 3×-speed during the recording operation continued, whereupon the answer for step S7 is affirmative. Then step S8 changes over the recording speed to the 3×-speed. When the tape moves to the tail end, the answer for step S9 is affirmative. Step S10 thereafter completes the recording operation.

On the other hand, in the case where the program being recorded can be recorded to the end of the program even if the recording operation is continued at the standard speed, the broadcast remaining time T1 is always shorter than the recordable time T2 at the 3×-speed, so that step S7 is always answered in the negative, and step S11 is answered in the affirmative upon the tape moving to the tail end, whereby the recording operation is completed in step S10.

When the broadcasting time information and the broadcasting time lapse information are not contained in the XDS signal, and step S4 is answered in the negative, step S11 follows to inquire as to whether the tape moves to the end. If the answer is affirmative, step S10 follows to terminate the recording operation. On the other hand, when step S11 is answered in the negative, step S4 follows again.

If the program being recorded has a commercial in an intermediate part, the broadcasting time information and the broadcasting time lapse information are not contained in the commercial, so that step S4 is answered in the negative during the commercial broadcasted. However, in the process of repeating the inquiry for step S4, step S4 is answered in the affirmative when the program being recorded is resumed. Thus the procedure for changing over the recording speed as described is performed.

Further, in the case where the broadcasting time information and the broadcasting time lapse information are not superposed as to the program being recorded, step S4 is always answered in the negative, and step S11 is answered in the affirmative upon the tape moving to the tail end, to complete the recording operation in step S10.

When the user selects the normal mode, the answer for step S2 is negative, followed by step S12 shown in FIG. 3, in which the recording operation is started at a recording speed selected by the user, i.e., either of a standard speed or a 3×-speed. Step S13 thereafter inquires as to whether the user performs a manipulation for a mode change, or for a recording speed change.

When the user performs a manipulation for changing the normal mode to the automatic mode or for changing the recording speed during a program being recorded, step S13 is answered in the affirmative, and step S2 shown in FIG. 2 follows again. On the other hand, if step S13 shown in FIG. 3 is answered in the negative, step S14 follows to inquire whether the tape moves to the tail end. If the answer is negative, step S13 follows again. If the answer is affirmative, step S10 shown in FIG. 2 follows to complete the recording operation.

Accordingly, even if the user changes the normal mode to the automatic mode during the program being recorded, the procedure for changing over the recording speed as described is performed.

The VCR of the present embodiment calculates the broadcast remaining time of the program being recorded by subtracting the broadcasting time lapse information from the broadcasting time information contained in the XDS signal as described above, eliminating the need for the information of broadcast starting time and broadcast termination time for calculating broadcasting time of the program to be recorded. This realizes the function in the automatic mode described above, not only during the automatic recording by timer setting but also during the normal recording by manual operation.

Further, the device does not require the user to input the broadcast termination time in using the function in the automatic mode, so that the user uses the function with a simple procedure unlike the conventional VCR which requires a manipulation of inputting the broadcast termination time.

Further, the VCR of the present embodiment always monitors whether the broadcasting time information and the broadcasting time lapse information are given during the program being recorded. When the XDS signal contains the time information described, the broadcast remaining time of the program being recorded is always calculated based on the time information. Therefore, even if the broadcasting time of the program being recorded is extended, the broadcast remaining time T1 is calculated based on the broadcasting time information and the broadcasting time lapse information updated according to the extended time. An inquiry is made as to whether the recording speed is changed over to the 3×-speed based on the broadcast remaining time T1 and the recordable time T2, whereby even if the termination of broadcast of the program being recorded becomes later than is scheduled, the program being recorded can be recorded to the end of the program.

Further, with the VCR of the present embodiment, when the broadcast remaining time T1 is in match with the recordable time T2 at the 3×-speed after the recording is started at the standard speed, the recording speed is changed over to the 3×-speed, and the time of the termination of the program being recorded is thus in match with the time of the tape moving to the tail end. Accordingly, the recording area of the tape is effectively used, and the desired program can be recorded with high-definition image to the greatest possible extent.

Further, the VCR of the present embodiment can change over the normal mode to the automatic mode during recording.

Second Embodiment

The XDS signal contains TITLE information representing the title of a program and RATING information entitled RATING. The VCR of the present embodiment completes the recording operation by utilizing the TITLE and the RATING information.

Figure 4:
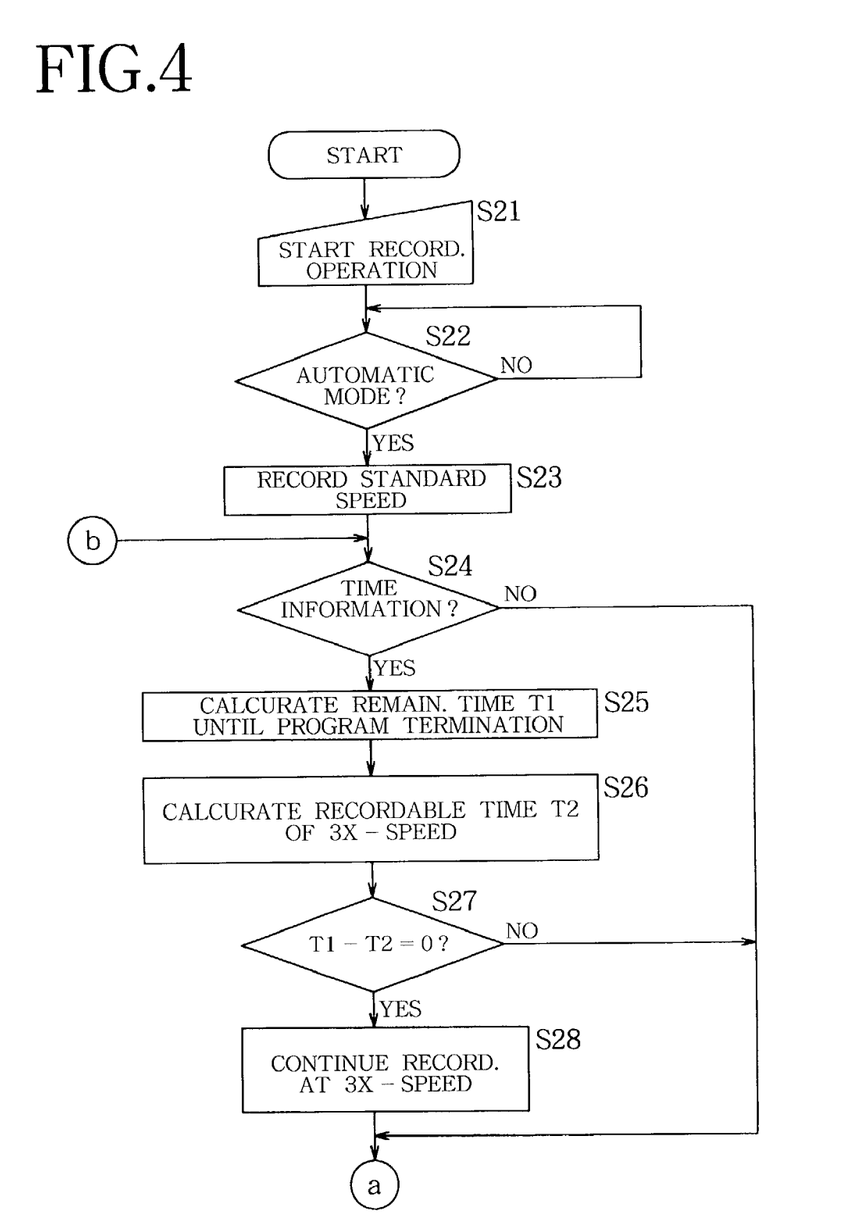
FIG. 4 is a flow chart showing a procedure to be performed by a control circuit included in a second embodiment.
Figure 5:
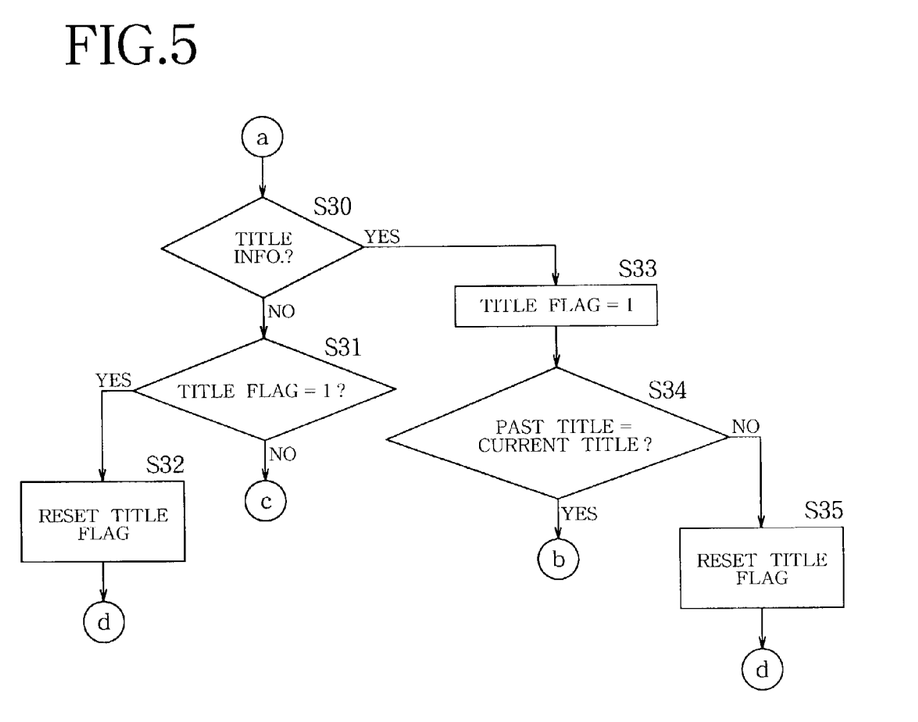
FIG. 5 is a first diagram showing part of FIG. 4.
Figure 6:
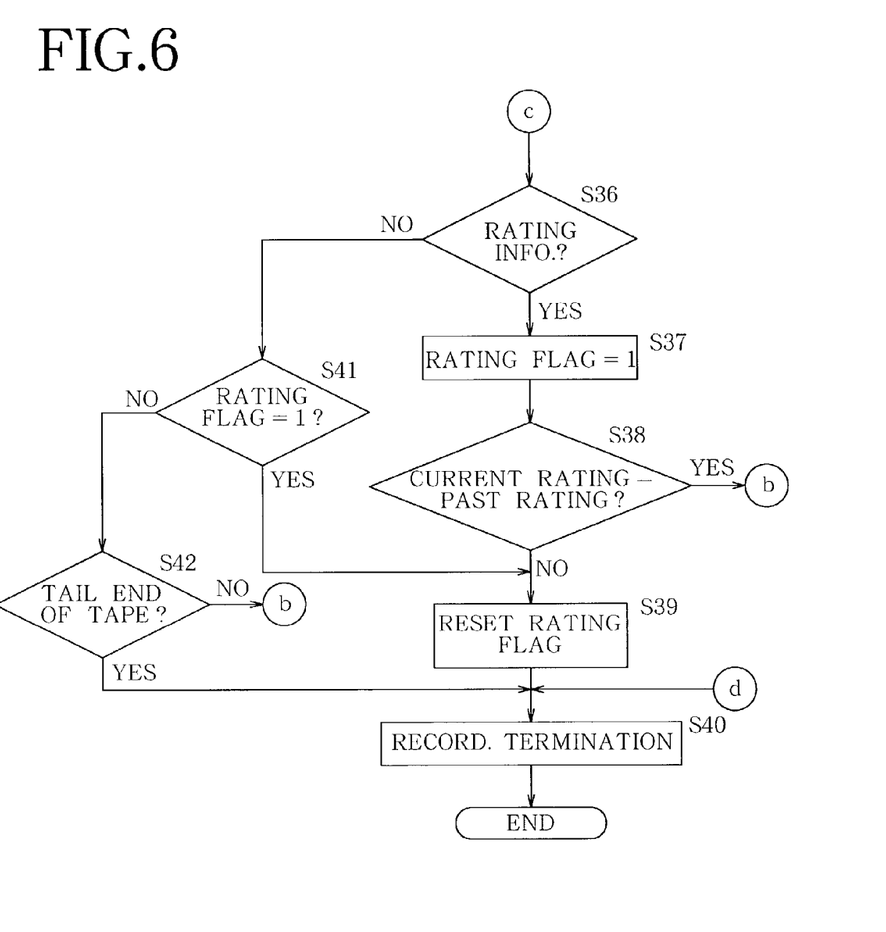
FIG. 6 is a second diagram showing another part of FIG. 4.

FIGS. 4 to 6 show procedures to be performed by the control circuit of the present embodiment for changing over the recording speed.

First, the recorder is initiated into a recording operation in step S21 shown in FIG. 4, and step S22 thereafter inquires whether the automatic mode is selected. If the inquiry is answered in the negative, step S22 follows again.

On the other hand, in the case where the user selects the automatic mode and the answer for S22 is affirmative, step S23 follows to start the recording operation at the standard speed, and thereafter an inquiry is made as to whether an XDS signal obtained from the XDS signal extraction circuit 4 contains the broadcasting time information and broadcasting time lapse information in step S24. If the answer is negative, the sequence proceeds to step S30 shown in FIG. 5 to execute recording termination procedure which will be described later.

In the case where the XDS signal contains the broadcasting time information and broadcasting time lapse information to make the answer for step S24 affirmative, the sequence proceeds to step S25 to calculate the broadcast remaining time T1 from the current time to the time of the broadcast termination of the program being recorded by subtracting the broadcasting time lapse information from the broadcasting time information.

Subsequently, the sequence proceeds to step S26 to calculate the recordable time T2 when the recording is performed at the 3× speed on the tape remaining area, followed by step S27 in which an inquiry is made as to whether the value obtained by subtracting the recordable time T1 from the broadcast remaining time T2 is zero. If the answer is negative, step S30 shown in FIG. 5 follows to execute the recording termination procedure which will be described later.

On the other hand, if the answer for step S27 is answered in the affirmative, step S28 follows to change over the recording speed to the 3×-speed, thereafter followed by step S30 shown in FIG. 5.

In step S30, an inquiry is made as to whether TITLE information is contained in the XDS signal. When the answer for step S30 is affirmative, step S33 follows to set TITLE flag to 1. In step S34, an inquiry is made as to whether TITLE information in the past is in match with current TITLE information. If the answer is affirmative, step S24 follows again shown in FIG. 4.

Accordingly, the TITLE information in the past is in match with the current TITLE information to continue the recording operation until the broadcast of the program being recorded is actually terminated, and the inquiry as to whether the broadcast time T1 is in match with the broadcast remaining time T2 is repeated.

The broadcast of the program being recorded is subsequently terminated, and the broadcast of the next program is started, whereupon the past TITLE information fails to match the current TITLE information, a negative answer is given in step S34, and step S35 follows, in which the TITLE flag is reset. Step S40 thereafter follows shown in FIG. 6 to complete the recording operation.

If the XDS signal contains no TITLE information, the answer for step S30 is negative shown in FIG. 5, followed by step S31, in which an inquiry is made as to whether TITLE flag is set to 1.

In the case where the TITLE information is superposed thereon for the program being recorded, not for the program next to the program being recorded, an affirmative answer is given in step S31 since the TITLE flag is set to 1. Step S32 then follows to reset the TITLE flag, and step S40 follows to complete the recording operation.

Furthermore, if no TITLE information is superposed thereon for the program being recorded, a negative answer is given in step S31 since TITLE flag is reset, followed by step S36 shown in FIG. 6.

In step S36, an inquiry is made as to whether the XDS signal contains RATING information. When the answer is affirmative, step S37 follows to set RATING flag to 1. In step S38 an inquiry is subsequently made as to whether RATING information in the past is in match with the current RATING information. If the answer is affirmative, step S24 follows again shown in FIG. 4.

Thus, the RATING information in the past is in match with the current RATING information to continue the recording operation until the broadcast of the program being recorded is actually terminated, and the inquiry is repeated as to whether the broadcast remaining time T1 is in match with the recordable time T2 at the 3×-speed.

Subsequently, when the broadcast of the program being recorded is terminated to start the broadcast of the program next to the program being recorded, the past RATING information fails to be in match with the current RATING information, and a negative answer is given in step S38. Step S39 follows to reset the RATING flag, followed by step S40 in which the recording operation is completed.

If the XDS signal contains no RATING information, a negative answer is given in step S36, followed by step S41 to inquire whether the RATING flag is set to 1.

In the case where the RATING information is superposed thereon for the program being recorded, and not for the program next to the program being recorded, an affirmative answer is given in step S41 since the RATING flag is set to 1. Step S39 then follows to reset the RATING flag, and step S40 follows to complete the recording operation.

Further, in the case where no RATING information is superposed thereon for the program being recorded, a negative answer is given in step S41 since the RATING flag is reset, followed by step S42.

In step S42, an inquiry is made as to whether the tape moves to the tail end. If the answer is negative, step S24 follows again shown in FIG. 4.

Accordingly, if neither TITLE information nor RATING information is superposed thereon for the program being recorded, the recording operation is continued until the tape moves to the tail end, and an inquiry is repeated as to whether the broadcast remaining time T1 is in match with the recordable time T2 at the 3x-speed.

When the tape thereafter moves to the tail end, an affirmative answer is given in step S42 shown in FIG. 6, followed by step S40 to complete the recording operation.

With the procedure described, the broadcast of the program being recorded is terminated and the program next to the program being recorded starts, whereupon the recording operation is completed. In the case where the program being recorded cannot be recorded on the tape to the end of the program with the recording operation continued at the standard speed, the broadcast remaining time T1 is in match with the recordable time T2, whereupon the recording speed is changed over to the 3x speed, so that the time when the broadcast of the program being recorded is terminated is in match with the time when the tape moves to a tail end.

While the present invention is embodied as VCRs according to the first and second examples described above, the invention can be embodied as the other known video recording devices like video disk players, etc. With recording devices using a disk as a recording medium, the recordable time for the disk can be changed by changing over information amount to be fed to the disk.

Furthermore, although the invention is embodied as VCRs alternatively settable by change-over between the standard speed and the 3x-speed according to the first and second embodiments, the invention can also be embodied as VCRs alternatively settable by change-over among given speeds.

Further, according to the first embodiment, the recording is automatically terminated upon the tape moving to the tail end, and according to the second embodiment, the recording is automatically terminated when the TITLE information or the RATING information contained in the XDS signal are given any change. However, the recording can also be terminated by user's manual manipulation, or can be terminated based on the recording remaining time T1 calculated according to step S5 shown in FIG. 2 and to step S25 shown in FIG. 4.

The invention claimed is:

1. A video recording device for receiving and recording on a recording medium television broadcast signals having superposed thereon for each program broadcasting time information representing broadcasting time of a program and broadcasting time lapse information representing lapse of time from start of the program broadcasted, and for changing recordable time on the recording medium by changing over recording operation of recording mechanism, the device being characterized in that the device comprising:
   means for receiving the television broadcast signals,
   information separating means for repeatedly separating the broadcasting time information and the broadcasting time lapse information from the television broadcast signal received,
   first time calculating means for repeatedly calculating broadcast remaining time remained from the current point until broadcast of the program being recorded is terminated based on the broadcasting time information and the broadcasting time lapse information which are separated during recording,
   second time calculating means for calculating the recordable time at the time when the broadcast remaining time is calculated according to the first time calculating means, and
   recording operation change-over means for changing over the recording operation of the recording mechanism during recording to operation, wherein the recordable time is in match with the broadcast remaining time or to operation wherein the recordable time becomes longer than the broadcast remaining time based on the broadcast remaining time calculated according to the first time calculating means and the recordable time calculated according to the second time calculating means.

2. A video recording device according to claim 1 wherein the device further comprises recording starting means for starting the recording operation of the recording mechanism so that the recordable time becomes shortest in response to a manipulation by the user, the second time calculating means calculates the recordable time when the recording operation is continued with operation for making the recordable time longest, and the recording operation change-over means changes over the recording operation of the recording mechanism to operation for making the recordable time longest when the broadcast remaining time is in match with the recordable time.

3. A video recording device according to claim 2 wherein the device further comprises capacity detecting means for detecting that the recording medium becomes full in recording capacity, and recording termination means for completing the recording operation of the recording mechanism when detecting that the medium becomes full in recording capacity.

4. A video recording device according to any one of claims 1 to 3 wherein the recording medium is a tap dike medium, and the recording operation change-over means changes over a moving speed of the medium.

5. A video recording device according to any one of claims 1–3 wherein the recording medium is a disklike medium, and the recording operation change-over means changes over information amount fed from the recording mechanism to the disklike recording medium.

* * * * *